(No Model.)  2 Sheets—Sheet 1.

F. L. CLARK.
CAR BRAKE MECHANISM.

No. 496,815. Patented May 2, 1893.

WITNESSES:
T. J. Hogan.
F. E. Gaither.

INVENTOR,
F. L. Clark,
by Snowden Bell, Att'y.

(No Model.)

F. L. CLARK.
CAR BRAKE MECHANISM.

No. 496,815. Patented May 2, 1893.

2 Sheets—Sheet 2.

WITNESSES:
T. J. Hogan.
F. E. Gaither

INVENTOR,
F. L. Clark,
by J. Snowden Bell.
Att'y.

UNITED STATES PATENT OFFICE.

FRANCIS L. CLARK, OF WILKINSBURG, ASSIGNOR TO THE WESTINGHOUSE AIR BRAKE COMPANY, OF PITTSBURG, PENNSYLVANIA.

CAR-BRAKE MECHANISM.

SPECIFICATION forming part of Letters Patent No. 496,815, dated May 2, 1893.

Application filed November 29, 1892. Serial No. 453,498. (No model.)

*To all whom it may concern:*

Be it known that I, FRANCIS L. CLARK, a citizen of the United States, residing at Wilkinsburg, in the county of Allegheny and State of Pennsylvania, have invented or discovered a certain new and useful Improvement in Brake Mechanism, of which improvement the following is a specification.

The object of my invention is to provide mechanism for use in a multiple cylinder brake system, whereby the force of one or more of the brake pistons may be exerted at will on the brakes; and to this end it consists of mechanism in connection with and operative by the pistons of the brake cylinders of a multiple cylinder brake system, whereby the brakes may be applied by pressure acting in one of the cylinders only or in more than one of them at the same time, as required, and whereby the force of the application may be lessened when the force acting on one of the brake pistons is reduced or removed, without interfering with or affecting the force due to the pressure in the remaining cylinder or cylinders.

The improvement claimed is hereinafter fully set forth.

My invention is specially applicable to a multiple cylinder brake system in which a single cylinder is employed to produce moderate or service application of the brakes, and in which two or more cylinders are employed to produce a full or emergency application.

Figure 1:
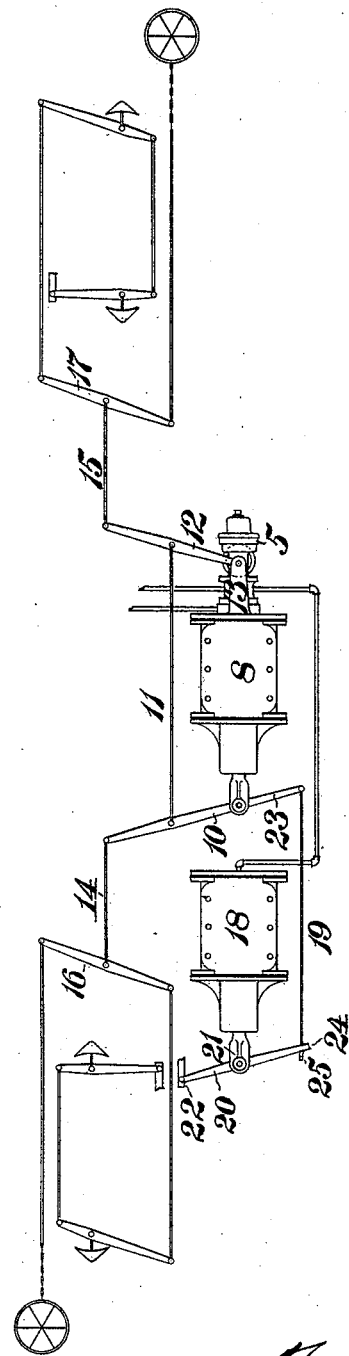
Figure 2:
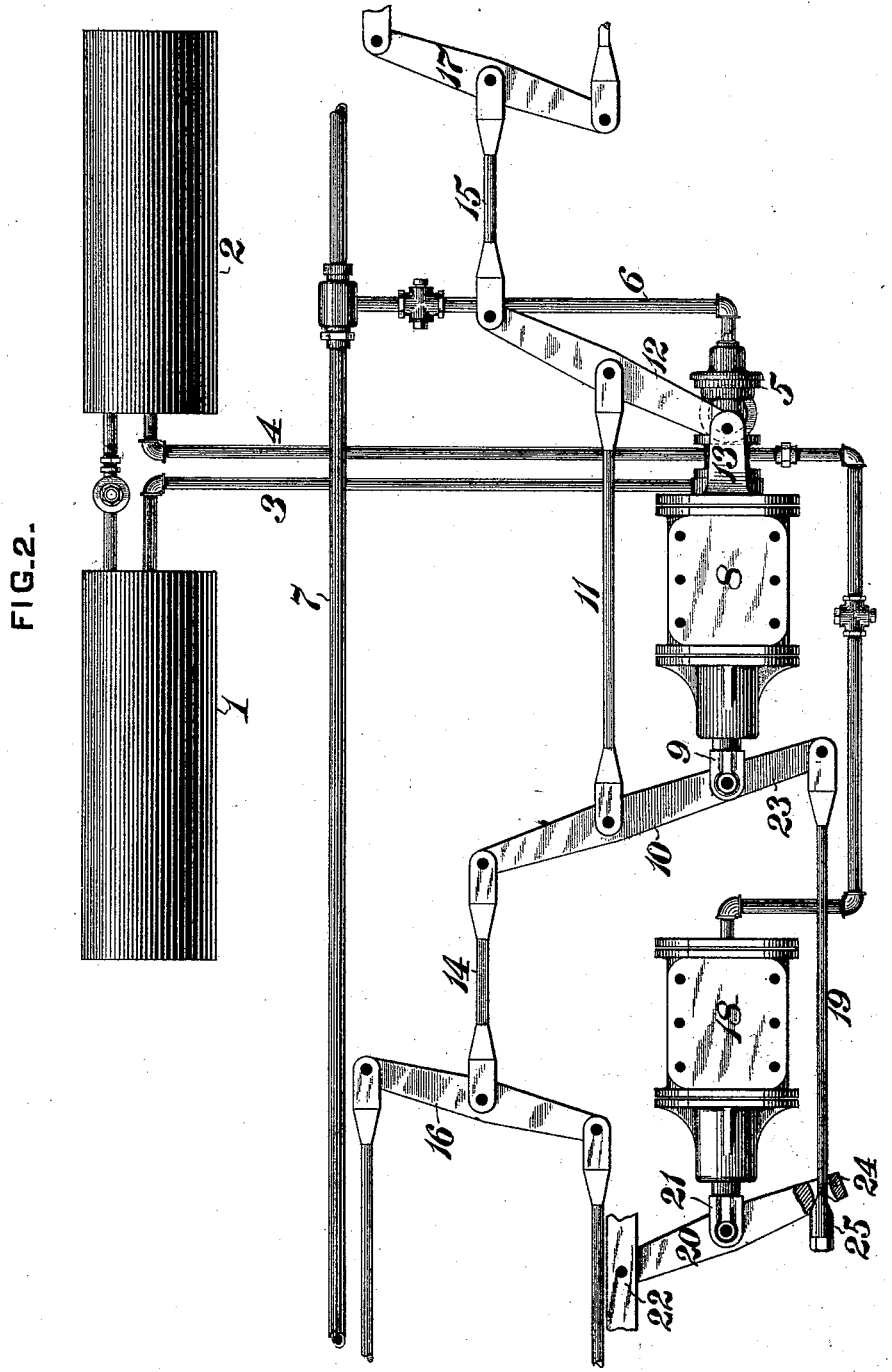

In the accompanying drawings, Figure 1 is a diagram of a brake mechanism illustrating an application of my improvement in connection with the hand operated devices, truck levers, and brake cylinders; and Fig. 2, a plan view, on a large scale, showing my improvement in connection with the brake cylinders.

My improvement is not limited in its employment to any particular fluid pressure system, but may be employed with either direct or automatic systems. Therefore the reservoirs 1, 2, branch pipes 3, 4, triple valve 5, branch pipe 6, and train pipe 7 and their connections which, in and of themselves, form no part of my invention, need not be described. My invention is, however, specially applicable to a system employing two or more brake cylinders, in which a moderate or graduated application of the brakes is made by admitting fluid under pressure to one cylinder, and a full or emergency application is made by admitting fluid under pressure both to the first cylinder and also to one or more additional cylinders which are automatically brought into operation.

In the drawings I have shown a cylinder 8 to which fluid pressure is admitted in all applications of the brake and which is the only cylinder employed in making graduated or service applications. The piston rod 9 of the cylinder 8 is pivoted to a lever 10, which is connected by means of a rod 11 to another lever 12, which is pivoted at one end to a lug 13, on the head of the cylinder 8; and the levers 10 and 12 are connected by means of rods 14 and 15 to levers 16 and 17 and through them to the truck levers at opposite ends of the car. The cylinder 18 is supplied with fluid under pressure only when it is desirable to apply the brakes with a greater force than it is possible to exert by the means of a single cylinder; and the cylinder 18 will, therefore, usually be employed only in making emergency applications of the brakes. The lever 10, which is operated by the piston rod 9, has an extension 23, to which is connected a rod 19, which passes through a slot or opening, 24, in a lever 20, to which the piston rod 21 of the cylinder 18 is connected. The brake cylinder lever 20 has at one end a stationary pivot, 22, which forms a fulcrum on which the lever may be moved by the movement of the piston rod 21, in such manner that the slotted end of the lever bears against the shoulder 25 when the brakes are being applied with the assistance of the cylinder 18; and when the pressure is released from the cylinder 18, while the brakes are still on, the slotted end of the lever 20 moves back from the shoulder 25 along the rod 19.

In making an application of the brakes by means of the cylinder 8 alone, the piston rod 9 moves outwardly, and with it the lever 10, which operates to apply the brakes, through the connections 14 and 16, to the wheels at one end of the car, and, through the parts 11, 12, 15, and 17, to the wheels at the other end. At the same time, the rod 19 which is connected to the extension 23 of the lever 10, moves outwardly and slides through the slot 24 in the lever 20; the lever 20 and piston rod 21 remaining stationary because no pressure has been admitted to the cylinder 18. When the fluid under pressure is released from the cylinder 8, the piston 9 is returned by the spring within the brake cylinder, and the brakes are released. The rod 19 then moves back to its normal position, which is such that a shoulder 25, formed on the rod 19, then bears lightly on one side of the lever 20. When fluid under pressure is admitted simultaneously to both cylinders, both of the piston rods 9 and 21 and the levers 10 and 20 are moved outwardly. The piston rod 9 operates, as before, through the lever 10 and its connections, to apply the brakes; and the lever 20 bears against the shoulder 25, and through the rod 19, adds the force of the fluid pressure within the cylinder 18 to that exerted on the lever 10 through the piston rod 9. The brakes will then be applied with a force due to the sum of the pressures acting on the pistons of the cylinders 8 and 18.

My invention is specially adapted for application with a fluid pressure system in which more than one cylinder is brought into action when the train is running at its highest speed, and in which the fluid pressure is reduced in, or released from, one or more of the cylinders as the speed of the train slackens and the wheels turn more slowly. Such a reduction of the pressure is made for the purpose of preventing the sliding of the wheels which would occur if the full pressure, which could be safely applied when the wheels are turning rapidly, continued to act when the momentum of the train had been reduced and the wheels were turning more slowly.

In a brake system with my improvement applied, the force of the application may be reduced, after both cylinders have been brought into action, by releasing the pressure from the cylinder 18, when the spring within the brake cylinder will return the piston rod 21 and lever 20 to their normal positions, without interfering with the application of the brakes by the fluid pressure acting within the cylinder 8. When the pressure is removed from the cylinder 18 the slotted end of the lever 20 moves away from the shoulder 25 on the rod 19, and the rod 19 remains in position until the pressure has been removed from the cylinder 8, when it moves back to its normal position in which the shoulder 25 bears against the side of the lever 20. The rod 19 may be pivoted to the lever 20, and pass through a slot in the lever 10; or it may be pivoted to either of the levers 10 or 20 at one end and be provided with a slot through which the lever at the other end passes, or through which a pin secured to the lever at the other end passes. Or, the connection 19 may be a flexible connection between the levers 10 and 20, which permits the independent movement of either one toward the other.

While I have herein shown but two cylinders, it is obvious that more than two may be used. For example by connecting the piston rod of another cylinder either directly to lever 20, or by means of another lever similar to lever 20 and another rod like rod 19 another cylinder may be connected to lever 10.

I claim as my invention and desire to secure by Letters Patent—

1. In a multiple cylinder brake mechanism, the combination with two or more brake cylinders, and their pistons, of levers connected to the piston rods, connection between the levers whereby one of them may move independently of the other, and connections from each lever to the truck levers at both ends of the car by which the movement of either piston may apply the brakes at both ends of the car, substantially as set forth.

2. In a multiple cylinder brake mechanism, the combination, with two brake cylinders and their pistons, of a lever pivoted to each piston rod, connections from one of the levers to the brake shoes, and a connection between the levers, by which the application of the brakes may be effected by the movement of one of the pistons independently of the other, or by the movement of both of the pistons, substantially as set forth.

3. In a brake mechanism, the combination, with two brake cylinders and their pistons, of a lever pivoted to one of the pistons, and having a fixed fulcrum at one end, and a loose connection at its other end with a lever which is pivoted to the other piston rod and connected to the truck levers at both ends of the car, substantially as set forth.

In testimony whereof I have hereunto set my hand.

FRANCIS L. CLARK.

Witnesses:
W. B. CORWIN,
F. E. GAITHER.